Jan. 29, 1963 N. J. REEBER 3,076,147

SUBCARRIER DETECTOR

Filed Nov. 12, 1959 2 Sheets-Sheet 1

Jan. 29, 1963 N. J. REEBER 3,076,147

SUBCARRIER DETECTOR

Filed Nov. 12, 1959 2 Sheets-Sheet 2

United States Patent Office 3,076,147

Patented Jan. 29, 1963

3,076,147

SUBCARRIER DETECTOR

Nicholas J. Reeber, Hicksville, N.Y., assignor to Hazeltine Research, Inc., a corporation of Illinois Filed Nov. 12, 1959, Ser. No. 852,354
2 Claims. (Cl. 329—140)

*General*

This invention relates to apparatus for detecting the information of a frequency-modulated subcarrier signal.

The subcarrier technique is fast becoming a popular way of transmitting a plurality of signals on one main carrier. With respect to FM signals, the subcarrier technique may be briefly explained as follows. The subcarrier, in the order of 50 kilocycles, is frequency modulated by a subcarrier modulating signal which contains information. The main carrier, in the order of 100 megacycles and representative of a channel frequency, is frequency modulated by both a main modulating signal, which also contains information, and the frequency-modulated subcarrier signal. Thus, two signals are transmitted in one channel and on the one main carrier which is representative of the channel frequency. Subcarrier transmission is feasible since each channel has an allowable band width which is capable of handling one or more subcarrier signals without interfering with adjacent channels or individual subcarrier signals.

At the receiving end, the main modulating signal is separated from the subcarrier and is detected, and the subcarrier modulating signal, in turn, is detected from the subcarrier. The present invention relates to a detector used for detecting the subcarrier modulating signal from the subcarrier. Among the advantages of this detector is that it is composed of a relatively small number of components. This, in turn, requires less power during operation. Both these factors render the unit more practical.

It is an object of the present invention, therefore, to provide new and improved apparatus for detecting information of a frequency-modulated subcarrier signal.

In accordance with a particular form of the present invention, in apparatus for detecting the information of a high-frequency carrier signal having a low-frequency frequency-modulated subcarrier signal with a large percentage deviation, means for translating the subcarrier signal at constant current. The invention also includes means, consisting of an inductance responsive to the subcarrier signal translated by the current translating means for developing an amplitude-modulated signal, the variations of which are in accordance with frequency variations of the subcarrier signal and detection means responsive to the amplitude-modulated signal for detecting the variations in amplitude.

For a better understanding of the present invention, together with other and further objects thereof, reference is had to the following description taken in connection with the accompanying drawings, and its scope will be pointed out in the appended claims.

Referring to the drawings.

Figure 1:
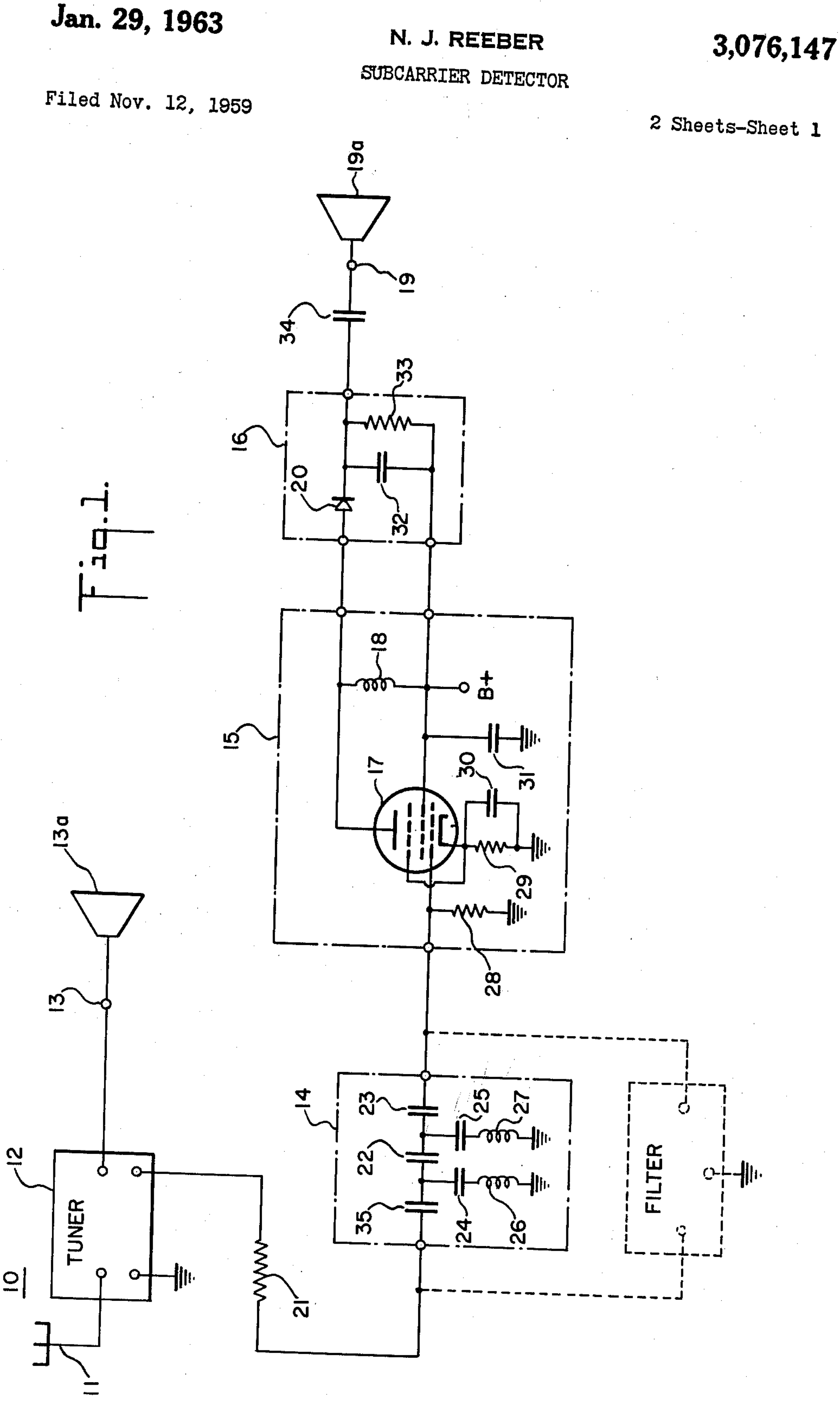
FIG. 1 is a preferred embodiment of the present invention.

*Description of Apparatus of FIG. 1*

FIG. 1 shows apparatus for detecting the information of a frequency-modulated subcarrier signal. Means 10 supply a high-frequency carrier signal having a frequency-modulated subcarrier signal of much lower frequency than the carrier and having a large percentage deviation. While the invention is not to be limited to any specific frequency or range of frequencies, typical frequencies will be cited as examples so that the understanding of the invention will be facilitated. The main carrier signal may have a frequency of the order of 100 megacycles, and the subcarrier signal may have a frequency of the order of 50 kilocycles. The maximum frequency deviation of the subcarrier which corresponds to the maximum amplitude of the subcarrier modulating signal may be of the order of $\pm 10$ kilocycles. The percentage deviation of the subcarrier, being the ratio of the maximum frequency deviation, namely 20 kilocycles, to the subcarrier frequency, namely 50 kilocycles, is therefore .4 which is large when compared to a frequency deviation of $\pm 75$ kilocycles and carrier frequency of 100 megacycles. The last two figures are typical of present FM carriers and allowable frequency deviations.

Means 10 may preferably include an antenna 11 and a conventional FM tuner 12. The tuner may include the basic circuits such as a local oscillator, intermediate-frequency amplifier, and a detector for detecting the main modulating signal of the main carrier. The main modulating signal is derived at an output terminal 13 and supplied to a suitable utilizing device such as a loudspeaker 13*a*. Connected to the tuner is the apparatus for detecting the information of the frequency-modulated subcarrier signal. This apparatus includes, in the order named, a filter 14; means 15 including a reactance responsive to the subcarrier signal for developing an amplitude modulated signal, the variations of which are in accordance with frequency variations of the subcarrier signal; and detection means 16 responsive to the amplitude modulated signal for detecting the variations in amplitude. Filter 14 is designed to have a pass band substantially equal to the maximum frequency deviation of the subcarrier signal and centered approximately at the subcarrier frequency. Means 15 may include an electron-discharge valve such as pentode 17 for translating the subcarrier signal at constant current. It should be noted that a transistor, which is capable of translating at constant current, may also be used in place of the pentode. Connected to the output of pentode 17 is a reactance, such as inductor 18 responsive to the subcarrier signal. Detection means 16 is composed of the conventional elements found in a basic AM detector. The subcarrier modulating signal is derived at an output terminal 19 and supplied to a suitable utilizing device such as a loudspeaker 19*a*.

*Operation of Apparatus of FIG. 1*

Figure 2:
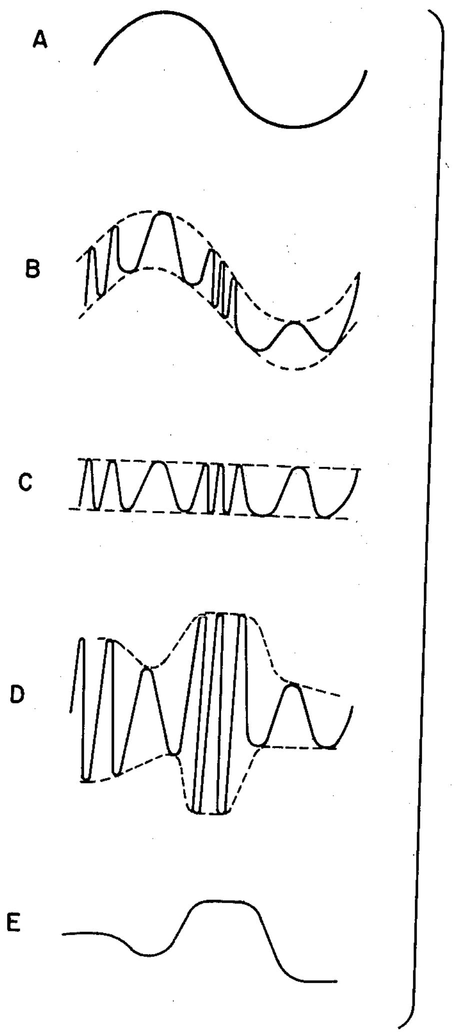
FIG. 2 shows curves which will facilitate the understanding of the invention.

Means 10 supply a high-frequency carrier signal having a frequency-modulated subcarrier of much lower frequency than the carrier. The frequency-modulated subcarrier of low frequency is frequency modulated to have a frequency deviation which results in a large percentage deviation of the subcarrier for reasons to be explained. More particularly, the subcarrier signal, having for example a frequency of the order of 50 kilocycles, is frequency modulated by a subcarrier modulating signal which causes a frequency deviation of about $\pm 10$ kilocycles in the subcarrier. The carrier signal of about 100 megacycles is frequency modulated by both a main modulating signal and frequency-modulated subcarrier signal. The antenna 11 receives the transmitted signal and supplies it to the tuner 12. The tuner 12 derives the main modulating signal along with the subcarrier signal in a conventional manner. The main modulating signal appears at an output terminal 13 and may be represented by curve A of FIG. 2. The subcarrier signal, which may be represented by curve B, is supplied to filter 14. Curve B shows that the frequency-modulated subcarrier has as its envelope the main modulating signal. Filter 14, having a pass band substantially equal to the maximum frequency deviation of the subcarrier signal and centered approximately at the subcarrier frequency, filters out the main modulating signal and derives only the subcarrier signal. This is shown in curve C. Curve C is the frequency-modulated signal which contains the information of the subcarrier modulating signal. The signal represented by curve C is supplied to means 15 which develops an amplitude-modulated signal, the variations of which are in accordance with frequency variations of the subcarrier signal. More particularly, if the current from the pentode 17 is maintained constant, the voltage across the inductive coil 18, which varies linearly with the frequency of the current through the coil, varies in amplitude in accordance with variations in frequency.

The amplitude-modulated signal developed across inductive coil 18 may be represented by curve D, the dotted portion thereof representing the amplitude modulation. It will be noticed that at this point in the apparatus, the frequency-modulation components are still present in the signal. In effect, the developed amplitude varying signal amplitude-modulates the frequency-modulated subcarrier. The signal represented by curve D is supplied to the detection means 16 which detect the amplitude-modulated signal or the variations in amplitude in a well-known manner and supply it to an output terminal 19. The detected signal, represented by curve E, is therefore the detected information of the subcarrier signal.

It is important to note that the use of the simple inductor 18 is practical only because the subcarrier frequency is low and its relative frequency deviation large, thereby resulting in a large percentage deviation. This is because the ratio of voltage swing to unmodulated voltage would be prohibitively small and the system would be excessively sensitive to amplitude variations of the input signal if low percentage deviation were used.

It is apparent from the foregoing that the apparatus may function even when two subcarriers are transmitted on the main carrier signal provided that appropriate subcarrier frequencies and maximum frequency deviations are chosen so that there will be no interference between adjacent channels or individual subcarriers. Additional filters, such as the one shown dotted, having different pass bands, may be placed in parallel with the filter 14. The subcarrier to be detected may be chosen by inserting a selector switch between the tuner and the filters and, in this way, selecting a particular filter having a pass band which corresponds to the particular subcarrier which is desired.

It is also apparent that the apparatus for detecting the information of a frequency-modulated subcarrier signal may be built within the tuner 12 so as to make the tuner and the apparatus for detecting the subcarrier one complete unit.

While applicant does not wish to be limited to any particular circuit constants, the following approximate circuit values are suitable for use in the apparatus represented by FIG. 1:

| | | |
|---|---|---|
| Pentode 17 | | 6AU6 |
| Diode 20 | | 1N295 |
| Inductor 18 | millihenries | 10 |
| Resistor 21 | kilohms | 15 |
| Capacitor 35 | micromicrofarads | 680 |

| | | |
|---|---|---|
| Capacitor 22 | micromicrofarads | 350 |
| Capacitor 23 | do | 750 |
| Capacitor 24 | do | 6800 |
| Capacitor 25 | do | 3000 |
| Inductor 26 | millihenries | 76 |
| Inductor 27 | do | 86 |
| Resistor 28 | kilohms | 15 |
| Resistor 29 | ohms | 470 |
| Capacitor 30 | microfarads | 0.1 |
| Capacitor 31 | do | 1.0 |
| Capacitor 32 | do | 0.003 |
| Resistor 33 | kilohms | 82 |
| Capacitor 34 | microfarad | 0.1 |
| Subcarrier frequency | kilocycles | 50 |
| Subcarrier band width | do | ±25 |

While there has been described what is at present considered to be the preferred embodiment of this invention, it will be obvious to those skilled in the art that various changes and modifications may be made therein without departing from the invention and it is, therefore, aimed to cover all such changes and modifications as fall within the true spirit and scope of the invention.

What is claimed is:

1. In apparatus for detecting the information of a high-frequency carrier signal having a low-frequency frequency-modulated subcarrier signal with a large percentage deviation: means for translating said subcarrier signal at constant current; means consisting of an inductance responsive to said subcarrier signal translated by said current translating means for developing an amplitude-modulated signal, the variations of which are in accordance with frequency variations of said subcarrier signal; and detection means, responsive to said amplitude-modulated signal, for detecting said variations in amplitude.

2. In apparatus for detecting the information of a high-frequency carrier signal having a low-frequency frequency-modulated subcarrier signal having large frequency deviation to subcarrier frequency ratio: means including a filter circuit having a pass band conforming to said frequency deviation for deriving the subcarrier signal; means for translating said subcarrier signal at constant current; means consisting of an inductance responsive to said subcarrier signal translated by said current translating means for developing an amplitude-modulated signal, the variations of which are in accordance with frequency variations of said subcarrier signal; and detection means, responsive to said amplitude-modulated signal, for detecting said variations in amplitude.

References Cited in the file of this patent

UNITED STATES PATENTS

| | | |
|---|---|---|
| 2,273,144 | Roberts | Feb. 17, 1942 |
| 2,276,672 | Roberts | Mar. 17, 1942 |
| 2,378,819 | Albright | June 19, 1945 |
| 2,428,265 | Crosby | Sept. 30, 1947 |
| 2,505,368 | Shenk et al. | Apr. 25, 1950 |
| 2,695,952 | Barton | Nov. 30, 1954 |
| 2,772,396 | Buie | Nov. 27, 1956 |
| 2,835,803 | Bose | May 20, 1958 |